United States Patent
Dunn et al.

(10) Patent No.: US 6,865,042 B2
(45) Date of Patent: Mar. 8, 2005

(54) EMBEDDED SERVO PATTERNING METHODS AND APPARATUS

(75) Inventors: George Anthony Dunn, San Jose, CA (US); Mantle Man-Hon Yu, San Jose, CA (US)

(73) Assignee: Hitachi Global Storage Technologies Netherlands N.V., Amsterdam (NL)

( * ) Notice: Subject to any disclaimer, the term of this patent is extended or adjusted under 35 U.S.C. 154(b) by 479 days.

(21) Appl. No.: 10/075,022

(22) Filed: Feb. 13, 2002

(65) Prior Publication Data

US 2003/0151840 A1 Aug. 14, 2003

(51) Int. Cl.$^7$ ................................................ G11B 5/09
(52) U.S. Cl. ........................ 360/48; 360/75; 360/77.08
(58) Field of Search .............................. 360/48, 49, 75, 360/77.07, 77.08; G11B 5/09, 20/12

(56) References Cited

U.S. PATENT DOCUMENTS

| | | | | |
|---|---|---|---|---|
| 4,016,603 A | * | 4/1977 | Ottesen | 360/135 |
| 4,048,660 A | * | 9/1977 | Dennison et al. | 360/77.08 |
| 5,010,430 A | * | 4/1991 | Yamada et al. | 360/235.4 |
| 5,121,280 A | | 6/1992 | King | |
| 5,377,178 A | | 12/1994 | Saito et al. | |
| 5,440,474 A | | 8/1995 | Hetzler | |
| 5,526,211 A | | 6/1996 | Hetzler | |
| 5,615,190 A | | 3/1997 | Best et al. | |
| 5,768,044 A | | 6/1998 | Hetzler et al. | |
| 5,784,219 A | * | 7/1998 | Genheimer | 360/77.08 |
| 5,903,410 A | | 5/1999 | Blaum et al. | |
| 5,956,196 A | | 9/1999 | Hull et al. | |
| 6,262,857 B1 | * | 7/2001 | Hull et al. | 360/51 |
| 6,288,861 B1 | | 9/2001 | Blaum et al. | |
| 6,469,853 B1 | * | 10/2002 | Satoh | 360/48 |

FOREIGN PATENT DOCUMENTS

| | | |
|---|---|---|
| JP | 4-95272 | 3/1992 |
| JP | 4-328369 | 11/1992 |
| JP | 5-120807 | 5/1993 |
| JP | 5-205419 | 8/1993 |

* cited by examiner

*Primary Examiner*—Sinh Tran
*Assistant Examiner*—Dan I Davidson
(74) *Attorney, Agent, or Firm*—John J. Oskorep, Esq.

(57) ABSTRACT

The present invention involves a recordable disk having a first plurality of $S_1$ servo sample wedges in a first servo zone at an outermost position on the disk, a second plurality of $S_2$ servo sample wedges in a second servo zone which is radially adjacent the first servo zone, and a third plurality of $S_3$ servo sample wedges in a third servo zone which is radially adjacent the second servo zone. The $S_1$ servo sample wedges of the first plurality are equally spaced apart circumferentially around the disk by a first angle $\theta_1$, the $S_2$ servo sample wedges of the second plurality are equally spaced apart circumferentially around the disk by a second angle $\theta_2 = \theta_1 * N_1$, and the $S_3$ servo sample wedges of the third plurality are equally spaced apart circumferentially around the disk by a third angle $\theta_3 = \theta_2 * N_2$. Advantageously, $S_2 = S_1/N_1$ and $S_3 = S_2/N_2$, the $S_2$ servo sample wedges of the second plurality are in radial alignment with every $N_1$th wedge of the $S_1$ servo sample wedges of the first plurality, and the $S_3$ servo sample wedges of the third plurality are in radial alignment with every $N_2$th wedge of the $S_2$ servo sample wedges of the second plurality. The number of servo samples are increased nearer the outer position of the disk for improved track following without increasing the number of servo samples at the inner position, which would undesirably decrease storage capacity, and no significant changes to servo detection hardware and software are required.

32 Claims, 10 Drawing Sheets

EMBEDDED SERVO PATTERNING METHODS AND APPARATUS

BACKGROUND OF THE INVENTION

1. Field of the Invention

This invention relates generally to disk drives and recordable disks, and more particularly to embedded servo disk drives and their associated disks.

2. Description of the Related Art

Consumer demand has been unrelenting for increased data storage capacity which can be made available to a computer user by a device having a physical profile that is the same or smaller than previous devices which provide less capacity. Even as the ability to store more information in less space is provided, the demand for even greater storage capacity in yet less space arises. There are two ways in which a manufacturer of a data storage unit can increase data storage capacity available to a user of a data storage device without increasing the size the of the storage medium within the device. First, the areal density can be increased. Areal density is the total number of bytes of information that can be stored per square inch of area on a storage medium. Second, the efficiency with which the medium is used can be increased. Efficiency is equal to the number of bytes of information which are available for use by the user, divided by the theoretical number of bytes that could be stored on the media if there were no area lost to overhead.

FIG. 1 is an illustration of the manner in which data is organized on a disk 103 in accordance with one particular type of direct access storage device (DASD), which is commonly utilized in an embedded servo disk drive. In accordance with disk 103 shown in FIG. 1, data is organized in data cells 101 stored within tracks 102 on disk 103. The data is read and written by a read/write head which is suspended over disk 103 as it rotates about a central axis through the center 104 of disk 103 and perpendicular to the plane of disk 103. Each track 102 is comprised of all the information stored on disk 103 at a particular radial distance from center 104 of disk 103. Tracks 102 can be identified either by the radial distance of the track from center 104 of disk 103 or by a track number which is assigned sequentially to each track 102 starting at the track furthest from center 104 of disk 103. In order to use disk 103 in the most efficient manner, the tracks lie in close proximity to one another. For the sake of clarity, however, tracks 102 shown in FIG. 1 are spaced relatively far apart. The width of track 102 is determined by the width of the read/write head and the skew angle of the read/write head (i.e., the angle of the longitudinal axis of the read/write head with respect to a line parallel to the tangent of track 102) and the track misregistration tolerance of the head positioning servo.

Each track 102 is divided by a plurality of conventional servo sample wedges 107 into a plurality of data wedges 105 in which data is stored. Each servo sample wedge 107 consists of a plurality of servo samples which radially extend from the outermost to innermost positions on disk 103 in "servo sectors". In FIG. 1, disk 103 is shown to have seven (7) servo sample wedges 107. Each one of the servo samples in servo sample wedges 107 includes information used to determine the radial and circumferential position of the read/write head (i.e., the particular track 102 in a particular data wedge 105 over which the read/write head is suspended at each point in time). U.S. Pat. No. 5,285,327 provides information related to servo sectors and is incorporated by herein by reference. The simple servo patterning shown in FIG. 1 (where the servo samples are equally spaced apart and the number of servo samples is constant and independent of the radius) advantageously provides for a simple conventional servo detection scheme which utilizes a single fixed servo sampling frequency for detection.

The portion of a track 102 which lies within one data wedge is hereinafter referred to as a "track wedge" 106. Each data cell 101 on disk 103 typically stores a uniform amount of information (512 bytes, for example). However, the track length (TL) varies as a function of the radial distance of the track from center 104 of disk 103. This is better illustrated in FIGS. 2 and 3. As shown in FIG. 2, the length of track portions within data wedges 105 are smaller at radius $R_3$ than at radius $R_1$. In FIG. 3, track portions 302, 304, and 306 at an outer diameter (OD), a middle diameter (MID), and an inner diameter (ID), respectively, on disk 103 are shown in more detail. The squares in FIG. 3 represent servo samples (such as servo sample 308) and the rectangles in FIG. 3 represent data wedges (such as data wedge 310). Each data wedge in FIG. 3 consist of one or more data sectors in which data is stored. FIGS. 4A–4C further illustrate track portions 302, 304, and 306, respectively, with respect to individual data sectors. As shown in FIG. 4A, track portions 302 at the OD have four (4) data sectors between each servo sample. Track portions 304 at the MID in FIG. 4B, however, have only two and a half (2.5) data sectors between each servo sample. In FIG. 4C, track portions 306 carry only two (2) data sectors between each servo sample.

As apparent, customer data storage is reduced at the ID due to the relatively large amount of storage area consumed by the servo sample data. If the number of servo sample wedges around the disk is chosen to be smaller, the area at the ID is advantageously freed up for customer data, but then track following by the read head at the OD becomes more difficult. Proper track following at the OD is already exacerbated by factors such as disk flutter, air turbulence, and servo control non-linearities such as those caused by actuator magnetic fields. These problems cause increased read data errors at the OD. Increased servo sampling around the disk would reduce the track following issues at the OD, but then the problem of decreased storage capacity at the ID would reemerge. If a smaller number of servo samples were positioned at the ID than at the OD in some arbitrary fashion, the complexity of the servo detector in the disk drive would undesirably be increased and make the detector—if even practically viable—more costly.

Accordingly, what are needed are embedded servo patterning methods and apparatus that provide for a relatively large amount of storage capacity at the ID (and less overhead), proper track following at the OD, and a relatively simple and cost-effective servo detection scheme in a disk drive.

SUMMARY OF THE INVENTION

The present invention involves a recordable disk having a first plurality of $S_1$ servo sample wedges in a first servo zone at an outermost position on the disk, and a second plurality of $S_2$ servo sample wedges in a second servo zone which is radially adjacent the first servo zone. The $S_1$ servo sample wedges of the first plurality are equally spaced apart circumferentially around the disk by a first angle $\theta_1$, and the $S_2$ servo sample wedges of the second plurality being equally spaced apart circumferentially around the disk by a second angle $\theta_2 = \theta_1 * N_1$. Advantageously, $S_2 = S_1/N_1$ and the $S_2$ servo sample wedges of the second plurality are in radial alignment with every $N_1$th wedge of the $S_1$ servo sample wedges of the first plurality. $N_1$ is an integer greater than or equal to two (2), and more particularly $2 \leq N_1 \leq 10$, but preferably $N_1=2$.

Advantageously, the number of servo samples are increased at the outer position of the disk for improved track following without increasing the number of servo samples at the inner position which would undesirably decrease storage capacity, and no significant changes to servo detection hardware and software are required.

The recordable disk may advantageously have additional servo zones patterned in the same manner. For example, the recordable disk may have a third plurality of $S_3$ servo sample wedges in a third servo zone which is radially adjacent the second servo zone. The $S_3$ servo sample wedges of the third plurality may be equally spaced apart circumferenfially around the disk by a third angle $\theta_3=\theta_2*N_2$. $S_3=S_2/N_2$ and the $S_3$ servo sample wedges of the third plurality are in radial alignment with every $N_2$th wedge of the $S_2$ servo sample wedges of the second plurality. $N_2$ is an integer greater than or equal to two (2), and more particularly $2 \leq N_2 \leq 10$, but preferably $N_2=2$.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 4A shows track portions at the OD, FIG. 4B shows track portions at the MID, and FIG. 4C shows track portions at the ID;

FIG. 10A shows track portions at the OD, FIG. 10B shows track portions at the MID, and FIG. 10C shows track portions at the ID;

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 5:
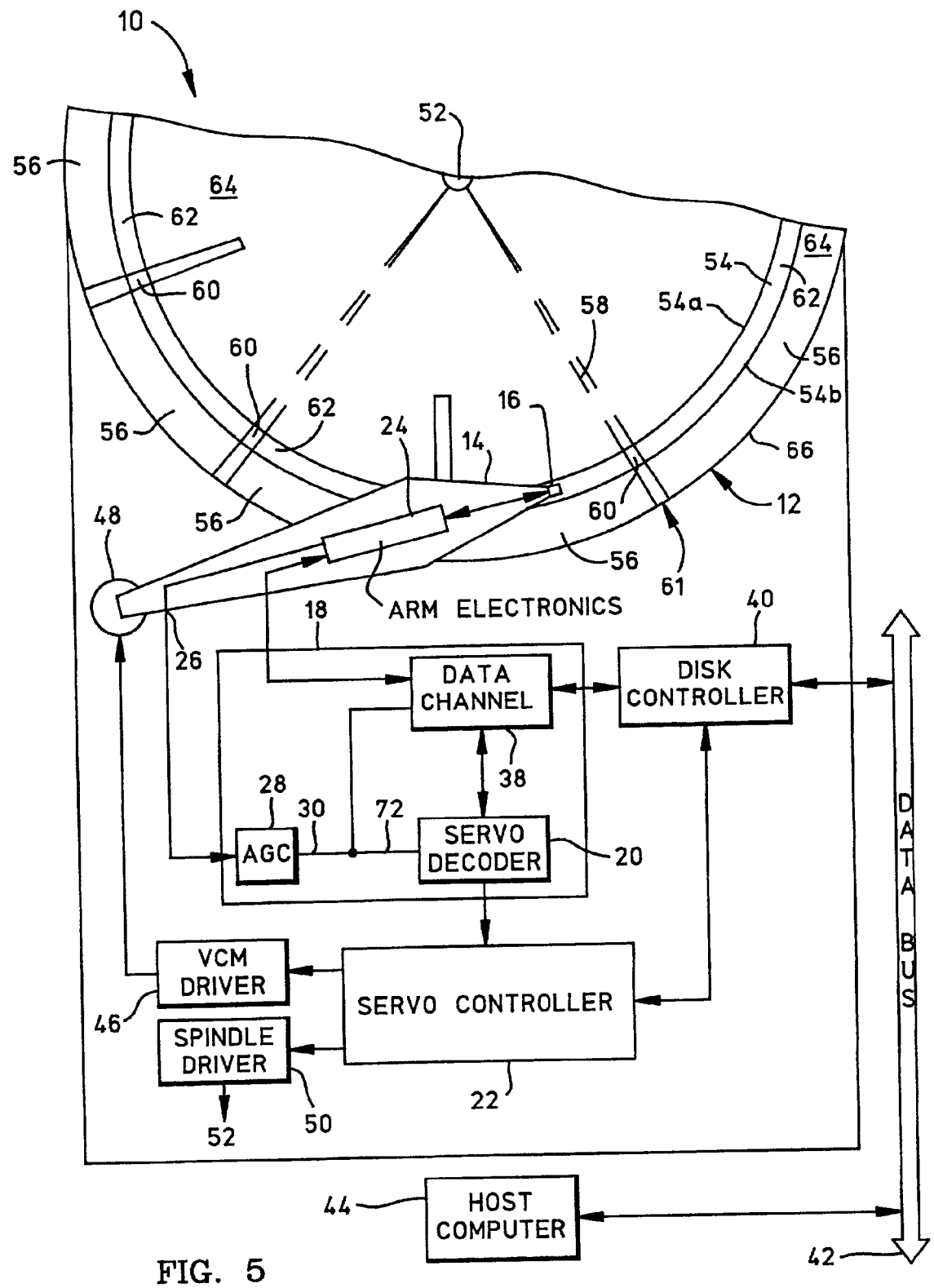
FIG. 5 is a schematic and illustrative diagram of a disk drive of the present invention.

FIG. 5 is an illustration of a particular direct access storage device (DASD) in accordance with the present invention. In particular, the DASD of FIG. 5 is a sector servo magnetic disk drive 10 constructed in accordance with the present invention. However, it should be understood that the present invention may be used in any DASD in which the storage medium is divided by servo sample wedges. The DASD shown in FIG. 5 is shown merely for illustrative purposes. General operation of disk drive 10 will now be described.

Disk drive 10 of FIG. 5 includes a storage medium 12 (or disk) that is rotated and a disk arm 14 that is moved radially across storage medium 12. Information is read and recorded from storage medium 12 as a sequence of transitions by an essentially conventional read/write head 16. A channel chip 18 contains read control circuitry for the detection and decoding of the readback signal from head 16. Chip 18 also contains write control circuitry for the encoding and modulation of the write current from or to head 16. In addition, chip 18 detects servo sector fine tracking, track number, and servo sector number information that corresponds to the disk track over which head 16 is actually located. Servo decoder 20 provides the track identification number to a servo controller 22 and, in response, servo controller 22 controls movement of disk arm 14. Servo controller 22 also provides the sector count information to data channel 38 in a conventional manner and, in response, data channel 38 generates the correctly timed read and/or write gates for its control.

In one embodiment, the readback signal produced by head 16 is provided to an arm electronics ("AE") 24 mounted on servo arm 14. AE 24 performs two functions. First, AE 24 provides a fast, high current write pulse for driving recording head 16 when data is being written. Second, AE 24 amplifies the read back signal from head 16 and provides the amplified signal over a pre-amplifier output line 26 to channel chip 18. In channel chip 18, the signal is preferably received at an automatic gain control (AGC) circuit 28 that adjusts the gain applied to the servo signal to maintain the signal amplitude within a range that is predetermined to simplify information processing, reduce noise, and improve system linearity. The amplified signal from AGC circuit 28 is provided over an AGC output line 30 to a data channel circuit 38 and servo decoder 20.

Data channel circuit 38 processes the signal provided by AGC 28 to reproduce user data recorded on storage medium 12 and provides such data to a disk controller 40. In one embodiment of the present invention, data channel 38 includes a signal equalizer for preconditioning the analog data signal and a data separator for converting the equalized data signal into ones and zeros synchronous to a channel clock signal. From disk controller 40, the user data is provided to a data bus 42, where the data is received by a host computer processor 44. Servo decoder 20 receives the output from AGC circuit 28, produces the disk track and servo sector identification numbers, and provides these numbers to servo controller 22. Servo decoder 20 may include a signal equalizer for preconditioning the analog servo signal and a position error signal (PES) demodulator which receives AGC 28 output and produces a PES which is coupled to servo controller 22. Servo controller 22 uses the servo sector identification number to control the timing of data channel 38, uses the track identification number to move head 16 to a desired track in a track seek operation and uses the PES to maintain head 16 centered over a track in a track following operation.

Disk controller 40 receives requests for reading and recording data on storage medium 12 from host computer 44 and thereby determines a desired disk track number at which to position read/write head 16. Disk controller 40 generates control signals to position read/write head 16 over for the desired track, and provides the control signals to servo controller 22. The control signals cause movement of disk arm 14 radially across storage medium 12 during track seek and track following by causing servo controller 22 to provide servo signals to a voice controlled motor (VCM) driver 46. VCM driver 46 generates servo control signals to control a VCM servo 48 that moves disk arm 14. Servo controller 22 also provides drive signals to a spindle motor driver 50, which generates spindle control signals to control a drive motor 52 that controls rotation of storage medium 12. Servo controller 22 uses the servo sector identification number to control the timing of data channel 38.

Figure 1:
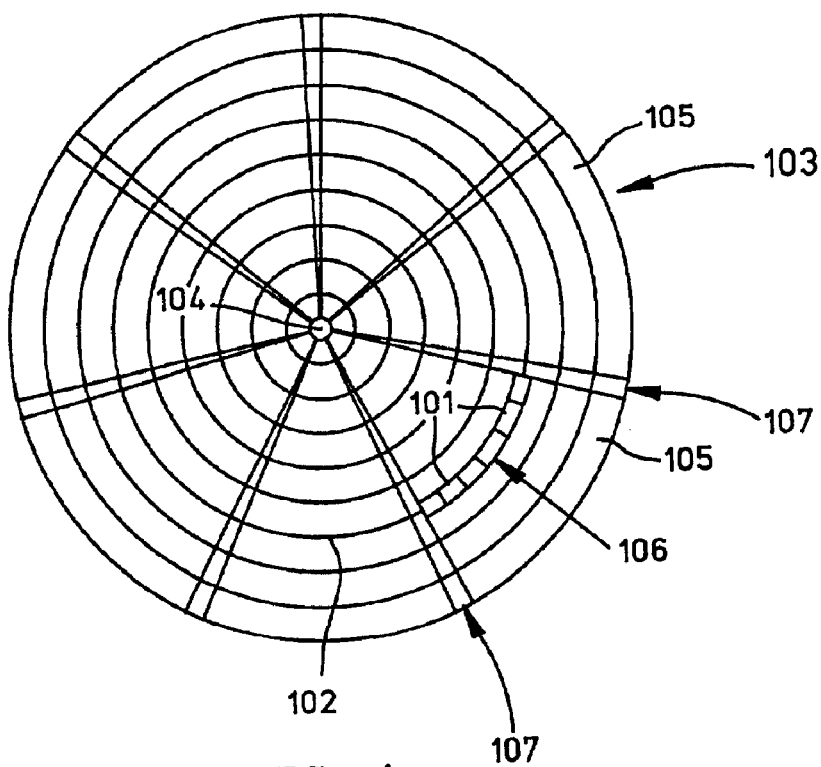
FIG. 1 is an illustration of a conventional disk (embedded servo type) for use in a conventional disk drive.
Figure 2:
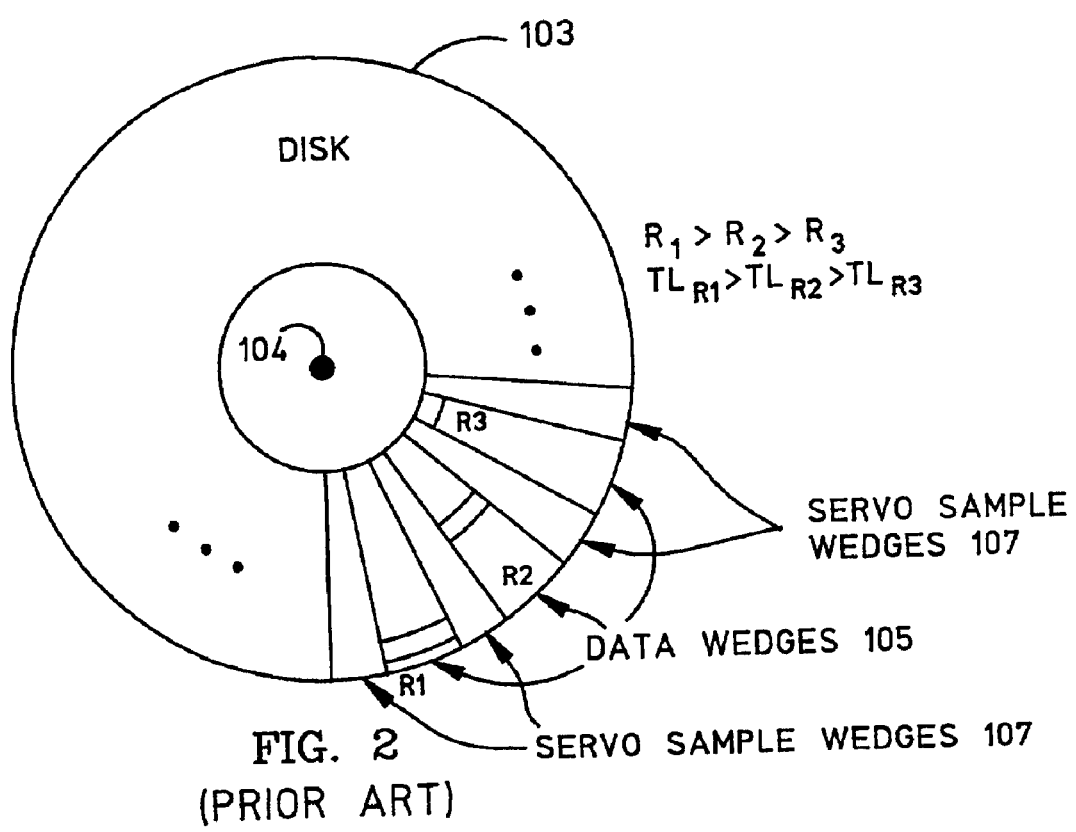
FIG. 2 is an illustration of the conventional disk of FIG. 1, showing the decreasing size of data wedges from the outer diameter (OD) to the inner diameter (ID) of the disk.
Figure 3:
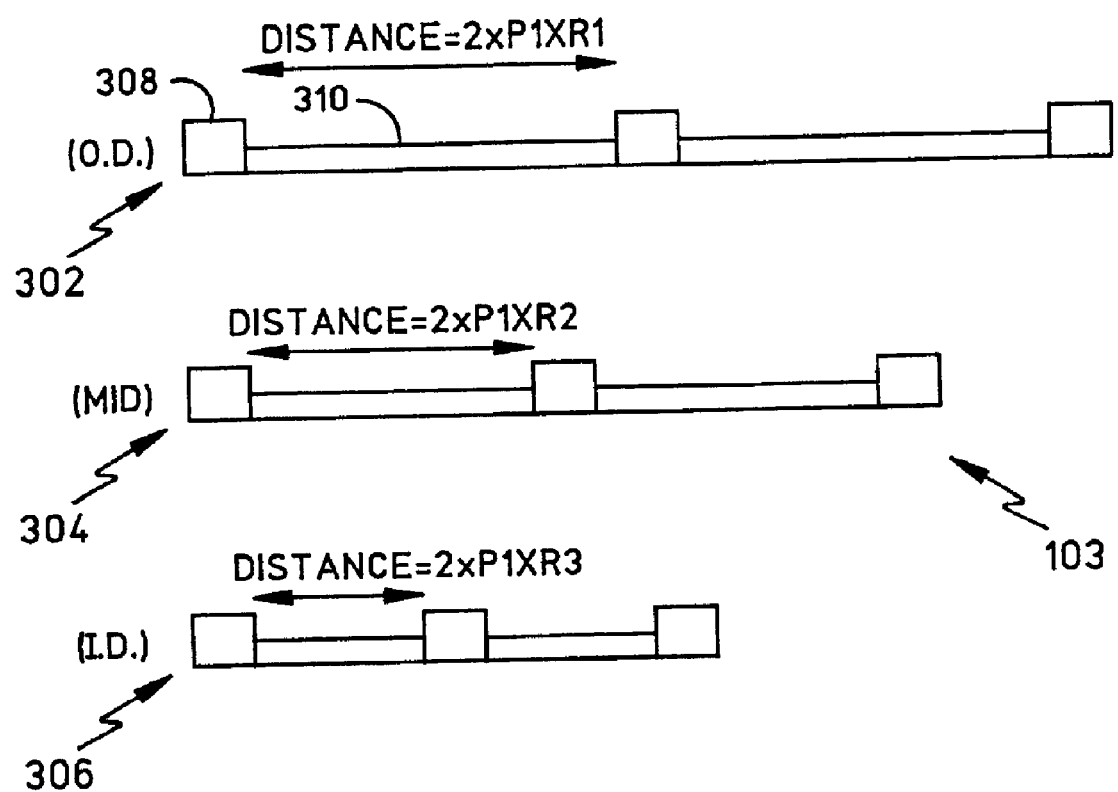
FIG. 3 is an illustration of track portions of the conventional disk of FIGS. 1 and 2, showing track portions at the OD, the ID, and the middle diameter (MID) of the disk.
Figure 4A:
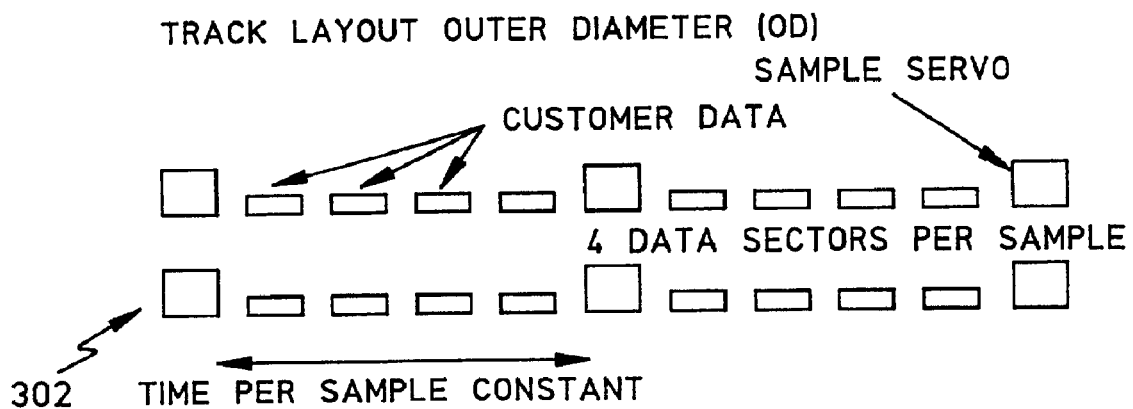
FIGS. 4A–4C are illustrations of the track portions of the conventional disk of FIGS. 1–3 which further illustrate data sectors, where
Figure 4B:
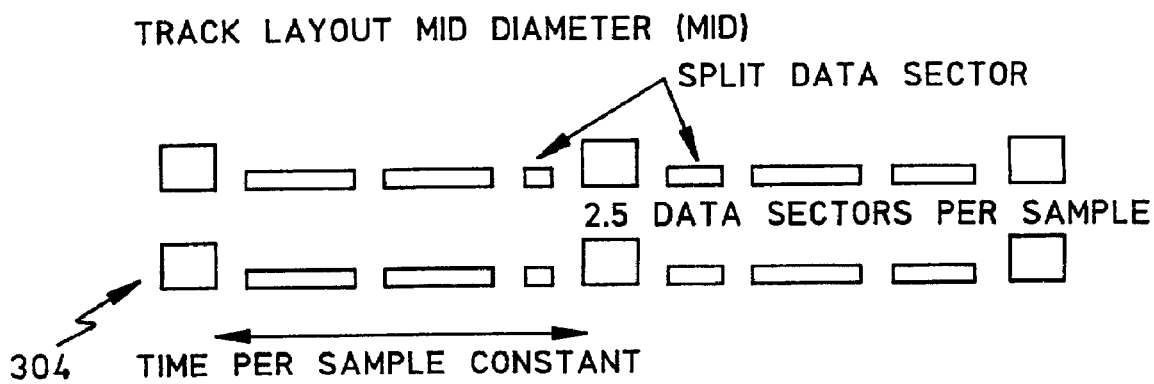
Figure 4C:
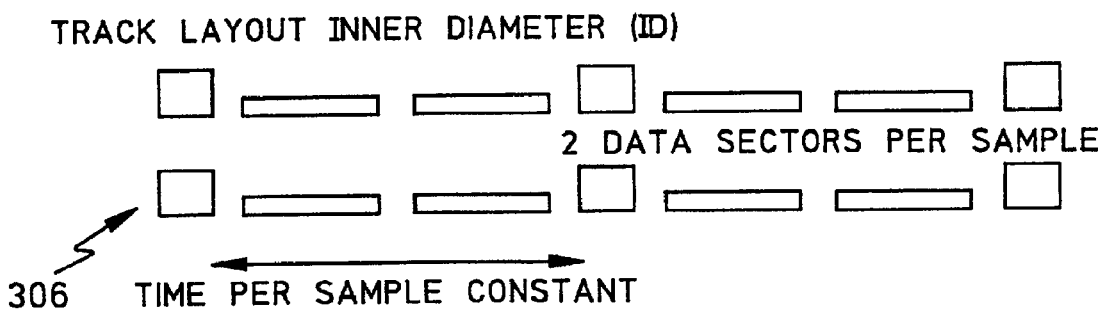

The servo information read by read/write head 16 is recorded at a predetermined location in each track of storage medium 12. In FIG. 4, a pair of concentric circular lines 54$a$, 54$b$ designate a single track 54 of storage medium 12. Only one servo track is shown in FIG. 4 for simplicity of illustration. Each track includes several track wedges 62, each spaced apart from two adjacent track wedges 62 by a servo sample 60. Each of track wedges 62 which lie within the boundaries of two adjacent servo samples 60 form a data wedge 56. The readback signal generated by read/write head 16 when it reads track 54 represents servo information when head 16 is over a servo sector 61 which includes each servo sample 60, which is located at the same angular location on the medium.

Likewise, the readback signal generated by the read/write head 16 represents data channel information when over a track wedge 62. Data in each track wedge 62 is formatted in data cells. Tracks 54 are grouped into data zones in which the data written to each of tracks 102 within the same data zone is written at a constant rate determined by a data clock. Accordingly, each track 54 within the same data zone has the same number of data cells. It should be noted that since each track 54 within a data zone is has the same number of data cells, each track wedge within a particular data zone and a particular data wedge 56 also has the same number of data cells. However, the bit density of each track wedge varies as a function of the radial distance of the track wedge from the center 52 of storage medium 12.

Figure 6:
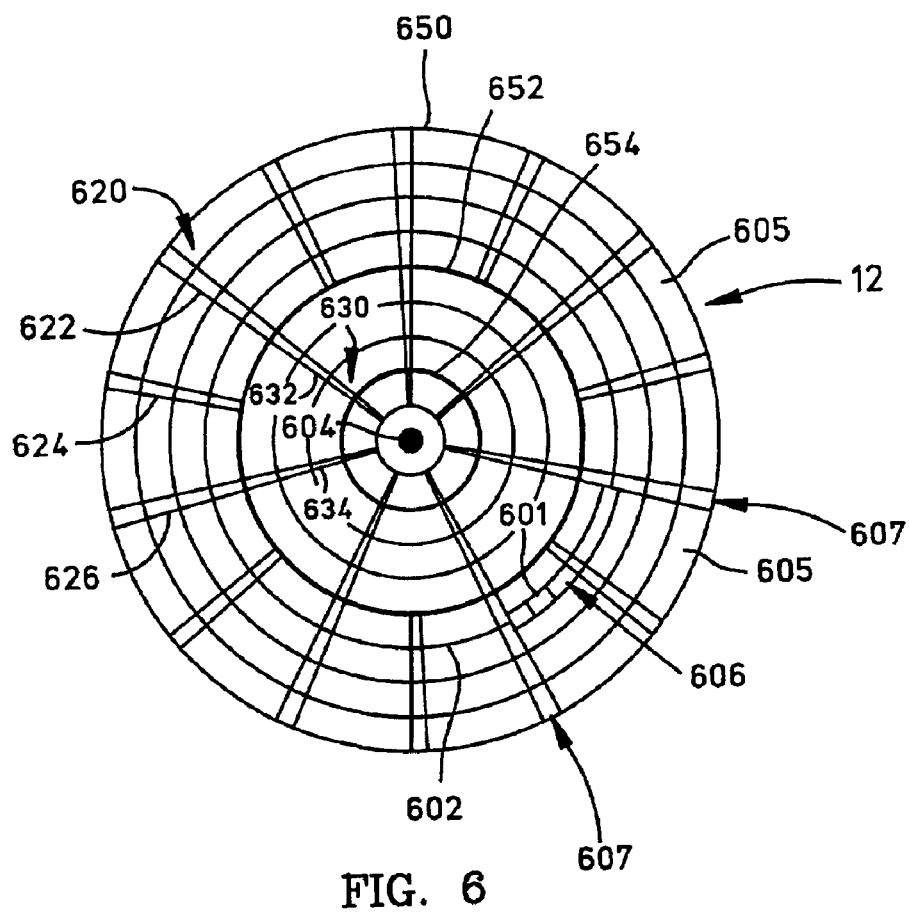
FIG. 6 is an illustration of one example of a recordable disk for use in the disk drive of FIG. 5.

FIG. 6 is an illustration of the manner in which data is organized on a recordable storage medium 12 for use an embedded servo disk drive such as drive drive 10 of FIG. 5. In accordance with storage medium 12 of FIG. 6, data is organized in data cells 601 stored within tracks 602 on storage medium 12. The data is read and written by a read/write head which is suspended over storage medium 12 as it rotates about a central axis through a center 604 of storage medium 12 and perpendicular to the plane of storage medium 12. Each track 602 is comprised of all the information stored on storage medium 12 at a particular radial distance from center 604 of storage medium 12. Tracks 602 can be identified either by the radial distance of the track from center 604 of storage medium 12, or by a track number which is assigned sequentially to each track 602 starting at the track furthest from center 604 of storage medium 12. In order to use storage medium 12 in the most efficient manner, the tracks lie in close proximity to one another. For the sake of clarity, however, tracks 602 shown in FIG. 6 are spaced relatively far apart. The width of a track 602 is determined by the width of the read/write head and the skew angle of the read/write head (i.e., the angle of the longitudinal axis of the read/write head with respect to a line parallel to the tangent of the track 602) and the track misregistration tolerance of the head positioning servo.

Each track 602 is divided by a plurality of servo sample wedges 607 into a plurality of data wedges 605 in which data is stored. Each servo sample wedge 607 consists of a plurality of servo samples stored in servo sectors. Each one of the servo samples in servo sample wedges 607 includes information used to determine the radial and circumferential position of the read/write head (i.e., the particular track 602 in a particular data wedge 605 over which the read/write head is suspended at each point in time) (see later discussion in relation to FIG. 9). The portion of a track 602 which lies within one data wedge is hereafter referred to as a "track wedge" 606. Each data cell 601 on storage medium 12 typically stores a uniform amount of information (512 bytes, for example). The track length (TL) varies as a function of the radial distance of the track from center 604 of storage medium 12.

A first "servo zone" lies within an outermost position 650 and an intermediate position 652 on storage medium 12, and a second "servo zone" lies within intermediate position 652 and an innermost position 654 on storage medium 12. The first servo zone has a first plurality of $S_1$ servo sample wedges 620 (such as wedges 622, 624, and 626), and the second servo zone has a second plurality of $S_2$ servo sample wedges 630 (such as wedges 632 and 634). In the specific example shown in FIG. 6, $S_1$ is fourteen (14) and $S_2$ is seven (7).

As shown, $S_2$ servo sample wedges of the second plurality 630 are in radial alignment with every $N_1$th wedge of the $S_1$ servo sample wedges of the first plurality 620. In this specific example, $N_1=2$, and therefore $S_2$ servo sample wedges of the second plurality 630 are in radial alignment with every other wedge (i.e., every 2nd wedge) of the $S_1$ servo sample wedges of the first plurality 620. More particularly, for example, $S_1$ wedge 622 is in radial alignment with $S_2$ wedge 632 and $S_1$ wedge 626 is in radial alignment with $S_2$ wedge 634, whereas $S_1$ wedge 624 is not in radial alignment with any $S_2$ wedge. Also, $S_1$ servo sample wedges of the first plurality 620 are equally spaced apart circumferentially around storage medium 12 by a first angle $\theta_1$, whereas $S_2$ servo sample wedges of the second plurality 630 are equally spaced apart circumferentially around storage medium 12 by a second angle $\theta_2=\theta_1*N_1$. In this specific example, $\theta_1=360/S_1=360/14=25.7$ degrees and therefore $\theta_2=\theta_1*N_1=25.7*2=51.4$ degrees. $N_1$ is an integer greater than or equal to two, and more particularly $2 \leq N_1 \leq 10$, but preferably $N_1=2$.

In the example of FIG. 6, the relatively low numbers of $S_1=14$ and $S_2=7$ are used to better illustrate the embedded servo patterning. In practice, however, these numbers are much greater. For example, in personal computers (PCs) where disk speeds of 5400–7200 revolutions per minute (RPMs) are utilized, typical numbers of servo sample wedges are 50 at the ID and 100 at the OD; in server-class applications where disk speeds of 10 K–15 K RPMs are utilized, typical numbers of servo sample wedges are 200 at the ID and 400 at the OD.

Figure 7:
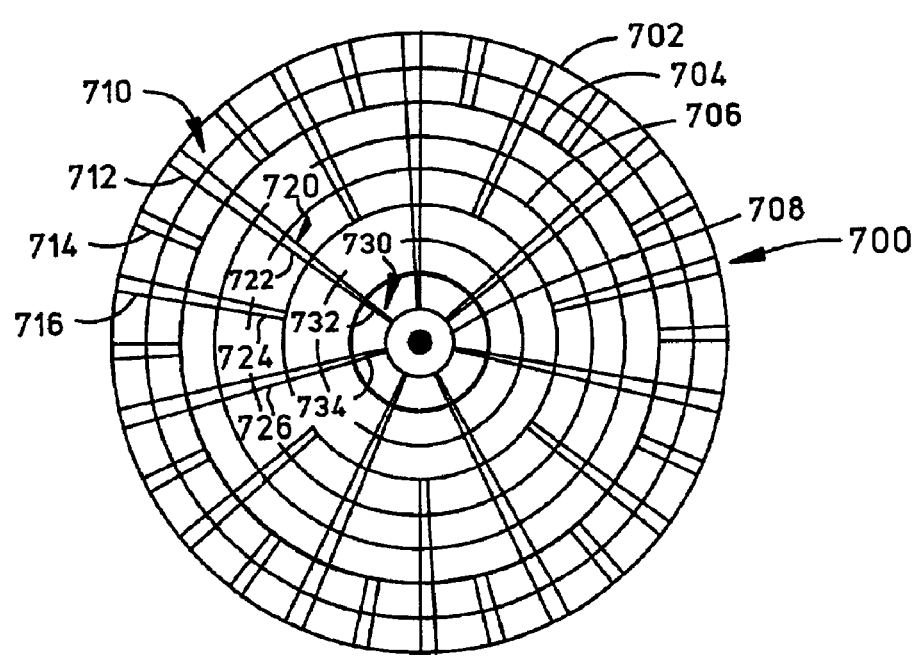
FIG. 7 is an illustration of another example of a recordable disk for use in the disk drive of FIG. 5.

Another example of a storage medium 700 is shown in FIG. 7. Storage medium 700 has three servo zones. Storage medium 700 has an outermost circumferential position 702, a first intermediate circumferential position 704, a second intermediate circumferential position 706, and an innermost circumferential position 708, where first intermediate position 704 lies in between outermost and second intermediate positions 702 and 706, and where second intermediate position 706 lies within first intermediate position 704 and innermost position 708. A first servo zone lies within outermost position 702 and first intermediate position 704, a second servo zone, lies within first intermediate position 704 and second intermediate position 706, and a third servo zone lies within second intermediate position 706 and innermost position 708. The first servo zone has a first plurality of $S_1$ servo sample wedges 710 (such as wedges 712, 714, and 716), the second servo zone has a second plurality of $S_2$ servo sample wedges 720 (such as wedges 722, 724, and 726), and the third servo zone has a third plurality of $S_3$ servo sample wedges 730 (such as wedges 732 and 734). In the specific example shown in FIG. 6, $S_1$ is twenty-eight (28), $S_2$ is fourteen (14), and $S_3$ is seven (7).

$S_2$ servo sample wedges of the second plurality 720 are in radial alignment with every $N_1$th wedge of the $S_1$ servo sample wedges of the first plurality 710. In this specific example, $N_1=2$, and therefore S2 servo sample wedges of the second plurality 720 are in radial alignment with every other wedge (i.e., every 2nd wedge) of the $S_1$ servo sample wedges of the first plurality 710. More particularly, for example, $S_1$ wedge 712 is in radial alignment with $S_2$ wedge 722 and $S_1$ wedge 716 is in radial alignment with $S_2$ wedge 724, whereas $S_1$ wedge 714 is not in radial alignment with any $S_2$ wedge.

In addition, $S_3$ servo sample wedges of the second plurality 730 are in radial alignment with every $N_2$th wedge of the $S_2$ servo sample wedges of the second plurality 720. In this specific example, $N_2=2$, and therefore $S_3$ servo sample wedges of the third plurality 730 are in radial alignment with every other wedge (i.e., every 2nd wedge) of the $S_2$ servo sample wedges of the second plurality 720. More particularly, for example, $S_2$ wedge 722 is in radial alignment with $S_3$ wedge 732 and $S_2$ wedge 726 is in radial alignment with $S_3$ wedge 734, whereas $S_2$ wedge 724 is not in radial alignment with any $S_3$ wedge.

$S_1$ servo sample wedges of the first plurality 710 are equally spaced apart circumferentially around storage medium 700 by a first angle $\theta_1$, whereas $S_2$ servo sample wedges of the second plurality 720 are equally spaced apart circumferentially around storage medium 700 by a second angle $\theta_2=\theta_1*N_1$, and whereas $S_3$ servo sample wedges of the third plurality 730 are equally spaced apart circumferentially around the disk by a third angle $\theta_3=\theta_2*N_2$. In this specific example, $\theta_1=360/N_1=360/28=12.9$ degrees and therefore $\theta_2=\theta_1*N_1=12.9*2=25.7$ degrees and $\theta_3=\theta_2*N_2=25.7*2=51.4$ degrees.

The embedded servo patterning may be described in another way. For example, consider storage medium 12 in FIG. 6. Storage medium 12 has a first plurality of $S_1$ servo sample wedges (i.e., the radially longest ones) and a second plurality of servo sample wedges (i.e., the radially shortest ones). The first plurality of $S_1$ servo sample wedges are equally spaced apart circumferentially around the disk, where each wedge of the first plurality of $S_1$ servo sample wedges contiguously radially extends from outermost position 650 on storage medium 12 to innermost position 654. The second plurality of $S_2$ servo sample wedges are equally spaced apart circumferentially around the disk and interleaved with the first plurality of $S_1$ servo sample wedges, where each wedge of the second plurality of $S_2$ servo sample wedges contiguously radially extends from outermost position 650 on storage medium 12 to intermediate position 652 on storage medium 12.

Figure 10A:
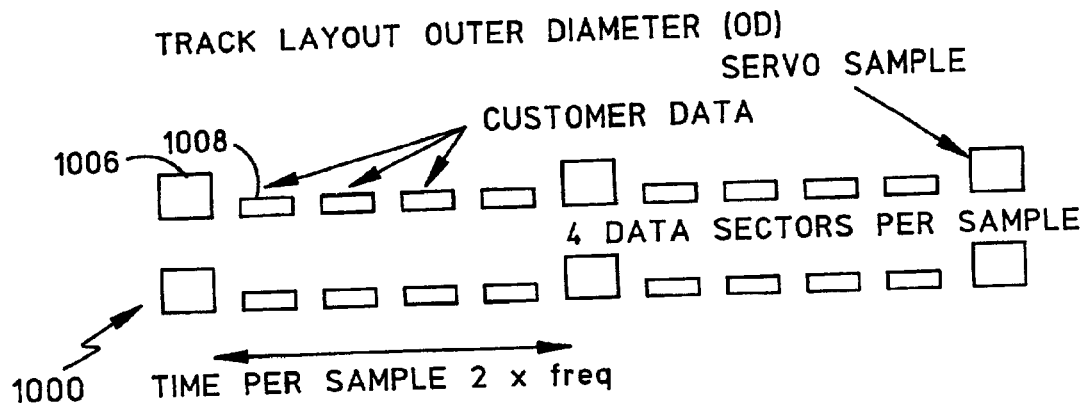
FIGS. 10A–10C are illustrations of the track portions of the disk of FIG. 6 showing data sectors, where
Figure 10B:
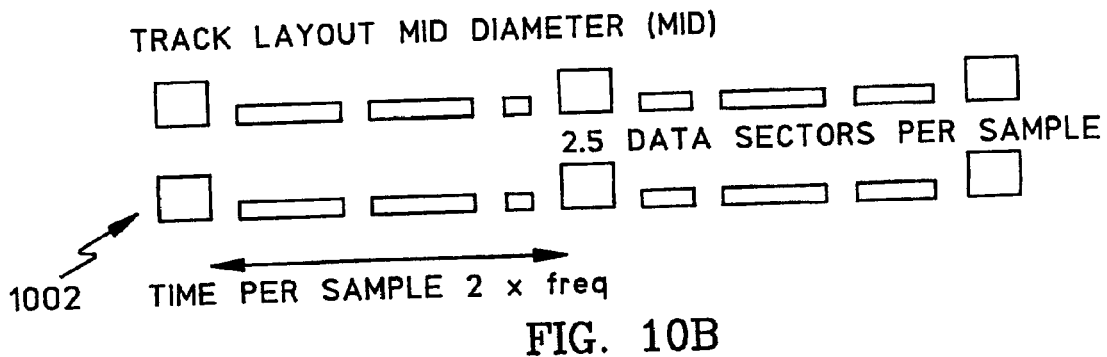
Figure 10C:
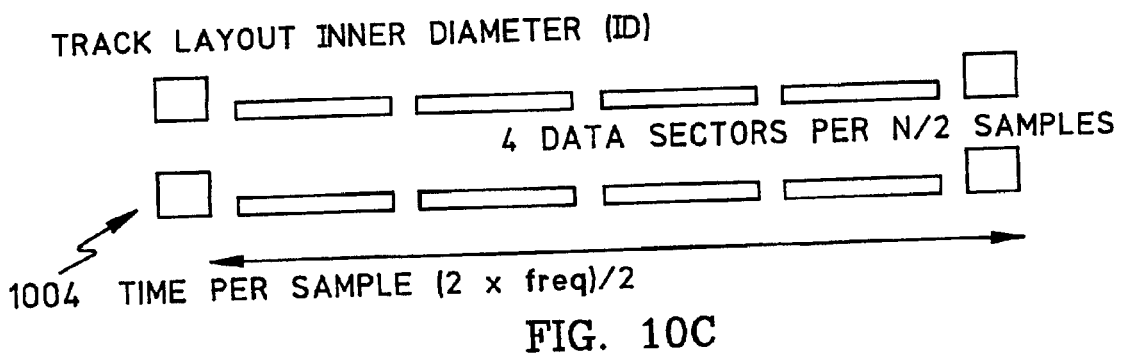

Referring now to FIGS. 10A–10C, track portions 1000, 1002, and 1004 of storage medium 12 are shown. The squares in FIGS. 10A–10C represent servo samples (such as a servo sample 1006) and the rectangles in FIGS. 10A–10C represent data sectors (such as a data sector 1008). Each data sector in FIGS. 10A–10C stores a predetermined amount of customer information (e.g., 512 bytes), plus additional data fields used by the read/write system (30–40 bytes) and the error correcting system (40–80 bytes) as well as a pad or flush field (2–10 bytes). For data blocks that are split across servo samples, this read/write overhead is repeated. Avoiding split data blocks across servo samples increases the number of data blocks that can be written on the disk. As shown in FIG. 10A, track portion 1000 at an outer diameter (OD) has four (4) data sectors between each servo sample. Track portion 1002 at a middle diameter (MID) in FIG. 10B has two and a half (2.5) data sectors (using split cells) between each servo sample. In FIG. 10C, however, track portion 1004 at an inner diameter (ID) carries four (4) data sectors between each servo sample. Thus, customer data storage capacity is increased at the ID (overhead is reduced), especially compared with track portions of FIGS. 4A–4C.

Figure 9:
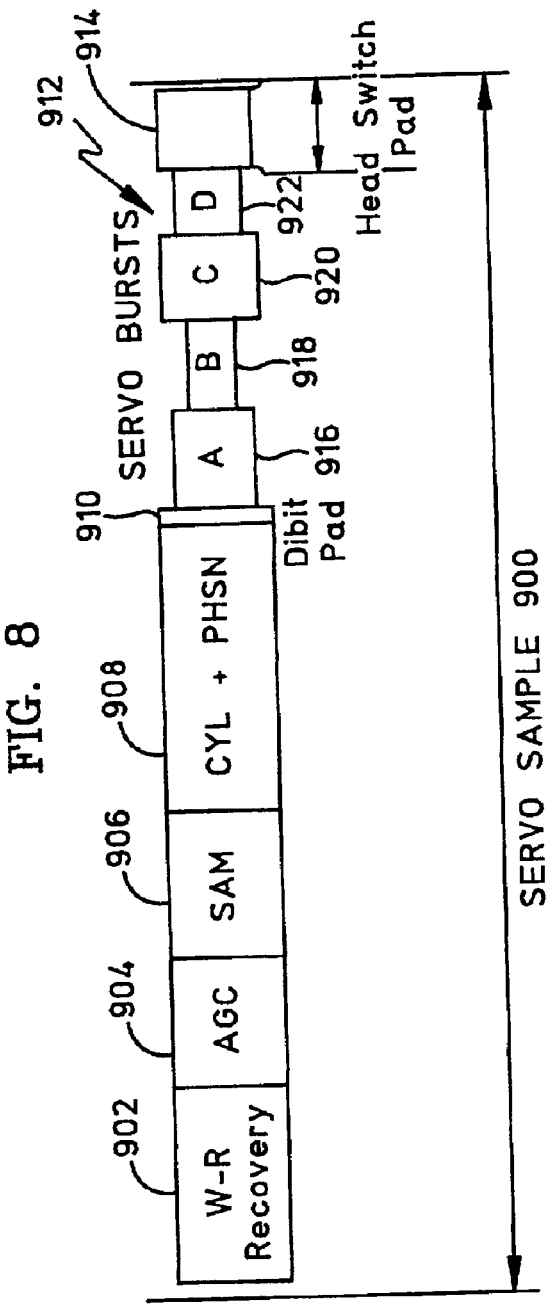
FIG. 9 is an illustrative representation of a servo sample.

As described earlier above, each servo sample wedge is formed of a plurality of servo samples which radially extend across the disk. FIG. 9 is an illustrative representation of the information contained in a single servo sample 900. Servo sample 900 includes a write-to-read recovery field 902, an automatic gain control (AGC) field 904, a Servo Address Mark (SAM) field 906, a Track Identifier field 908, a bit pad field 910, a plurality of servo burst fields 912, and a head switch pad field 914. In this embodiment, the plurality of servo burst fields 912 include a first servo burst A 916, a second servo burst B 918, a third servo burst C 920, and a fourth servo burst D 922.

Figure 8:
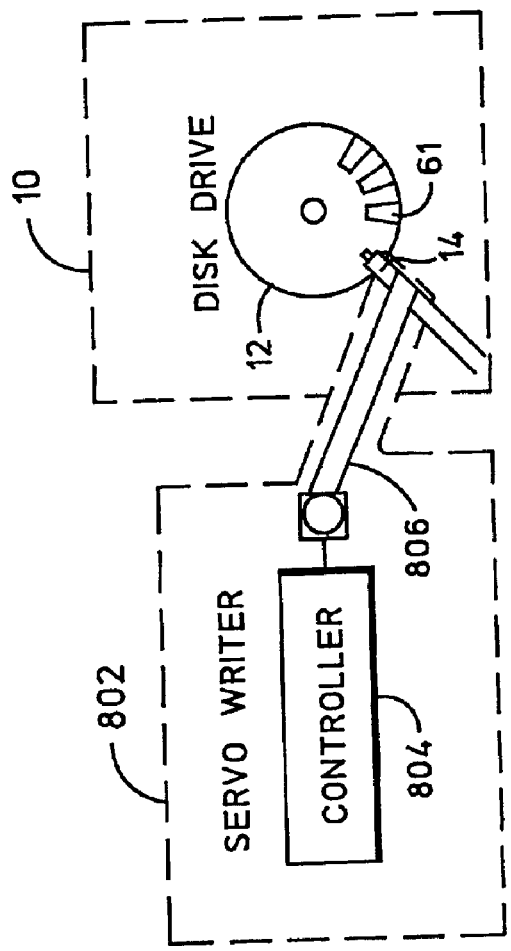
FIG. 8 is an illustration of a servo writer attached to the disk drive of FIG. 5 for writing servo samples on a disk.

Referring now to FIG. 8, a servo writer 802 which is attached to disk drive 10 is shown. After or as part of the manufacturing of disk drive 10, servo writer 802 is employed to write servo samples around storage medium 12. Conventional hardware components of servo writer 802 include a controller 804 and a positioning arm 806 (or "pusher probe") which is attachable to arm 14 of disk drive 10. In response to software instructions which are embodied in memory of controller 804, controller 804 controls the position of positioning arm 806 (which precisely moves arm 806 of disk drive 10) and the exact locations at which servo samples are written on storage medium 12. The software instructions of servo writer 802 are described later in relation to the flowchart of FIG. 11, which cause the servo patterns described herein (e.g., FIGS. 6–7 and FIGS. 13–16) to be written on storage medium 12.

Figure 11:
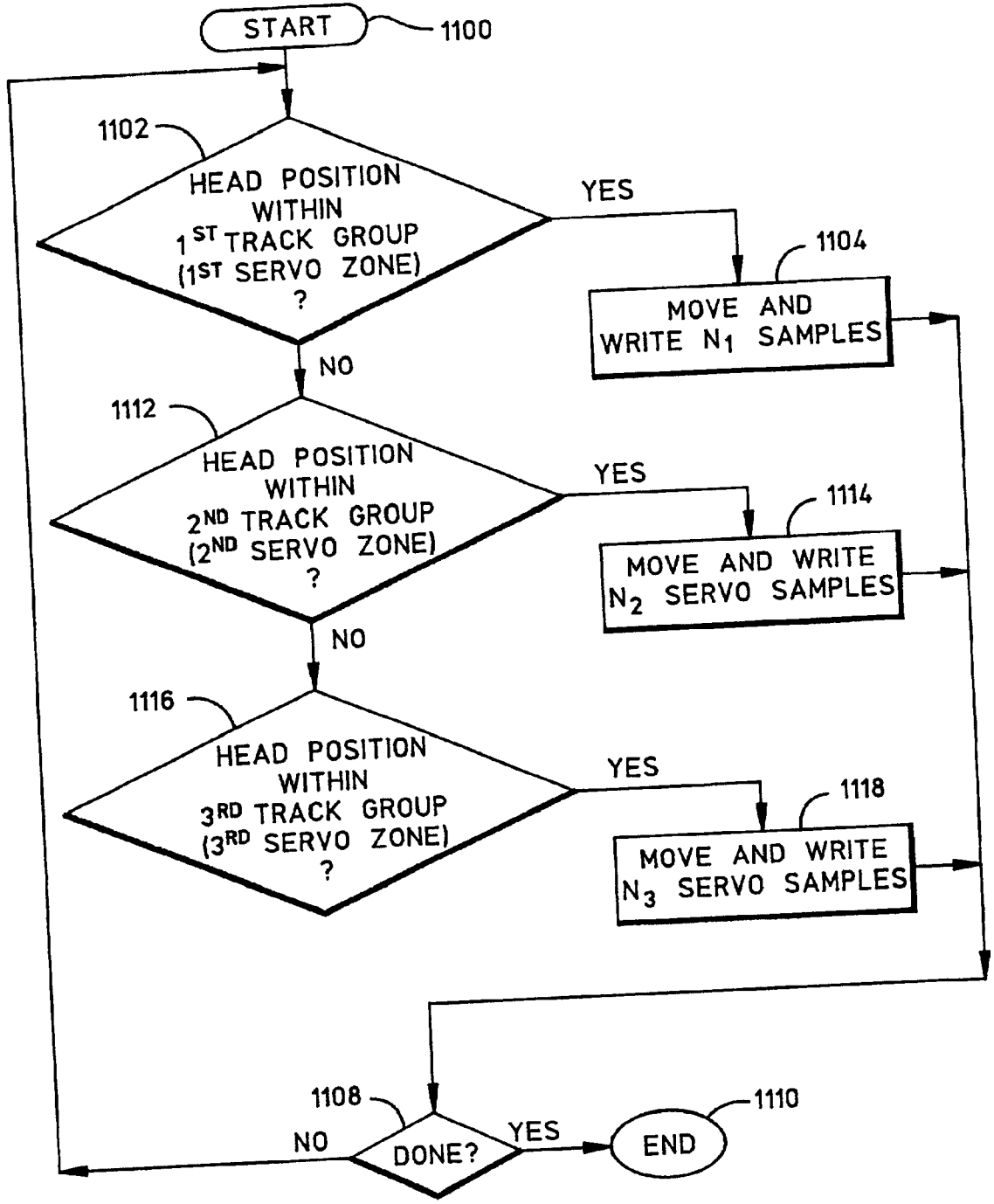
FIG. 11 is a flowchart describing a method of writing servo samples to a disk with use of the servo writer of FIG. 8.

FIG. 11 is a flowchart which describes a method of writing servo samples to a disk using servo writer 802 of FIG. 8. FIGS. 8 and 11 are now referred to in combination. Beginning at a start block of FIG. 11, controller 804 determines whether the head position in disk drive 10 should be within a first servo zone defined by a first group of tracks (e.g., tracks 0–100) (step 1102). If so, controller 804 moves positioning arm 806 such that arm 14 of disk drive 10 moves within the first servo zone, and causes Nservo samples to be written on each track within the first servo zone, one at every predetermined disk angle $\theta_1$ (step 1104).

If the head position should not be within the first servo zone in step 1102, then controller 804 determines whether the head position in disk drive 10 should be within a second servo zone defined by a second group of tracks (e.g., tracks 101–200) (step 1112). If so, controller 804 moves positioning arm 806 such that arm 14 of disk drive 10 moves within the second servo zone, and causes $N_2$ servo samples to be written on each track within the second servo zone, one at every predetermined disk angle $\theta_2=\theta_1{}^*N_1$ and aligned with every $N_1$th servo sample of the first servo zone (step 1114). If the head position should not be within the second servo zone at step 1112, then controller 804 determines whether the head position in disk drive 10 should be within a third servo zone defined by a third group of tracks (e.g., tracks 201–300) (step 1116). If so, controller 804 moves positioning arm 806 such that arm 14 of disk drive 10 moves within the third servo zone, and causes $N_3$ servo samples to be written on each track within the third servo zone, one at every predetermined disk angle $\theta_3=\theta_2{}^*N_2$ and aligned with every $N_2$th servo sample of the second servo zone (step 1118).

When servo writer is finished writing servo samples on storage medium 12 (step 1108), the flowchart ends at an end block 1110; otherwise, the flowchart starts again at step 1102. When end block 1110 is reached, the result is a disk which has the servo patterns described herein, for example, those described in relation to FIGS. 6, 7, 13, 14, 15, and 16.

Thus, a first plurality of $S_1$ servo sample wedges, a second plurality of $S_2$ servo sample wedges, and a third plurality of $S_3$ servo sample wedges were written to storage medium 12 by the method of FIG. 11. The first plurality of servo sample wedges are in a first servo zone at an outermost position on the recording disk, the second plurality of $S_2$ servo sample wedges are in a second servo zone which is radially adjacent the first servo zone, and the third plurality of $S_3$ servo sample wedges are in a third servo zone which is radially adjacent the second servo zone. The $S_2$ servo sample wedges of the second plurality are in radial alignment with every $N_1$th wedge of the $S_1$ servo sample wedges of the first plurality, where $S_1$, $S_2$, and $N_1$ are integers $\geq 2$ and $S_2=S_1/N_1$. Preferably, $N_1=2$. The $S_3$ servo sample wedges of the third plurality are in radial alignment with every $N_2$th wedge of the $S_2$ servo sample wedges of the second plurality, where $S_3$ is an integer and $S_3=S_2/N_2$. Preferably, $N_2=2$. The $S_1$ servo sample wedges of the first plurality are equally spaced apart circumferentially by a first angle $\theta_1$; the $S_2$ servo sample wedges of the second plurality are equally spaced apart circumferentially by a second angle $\theta_2$, where $\theta_2=\theta_1{}^*N_1$; and the $S_3$ servo sample wedges of the third plurality are equally spaced apart circumferentially by a third angle $\theta_3$, where $\theta_3=\theta_2{}^*N_2$.

Figure 12:
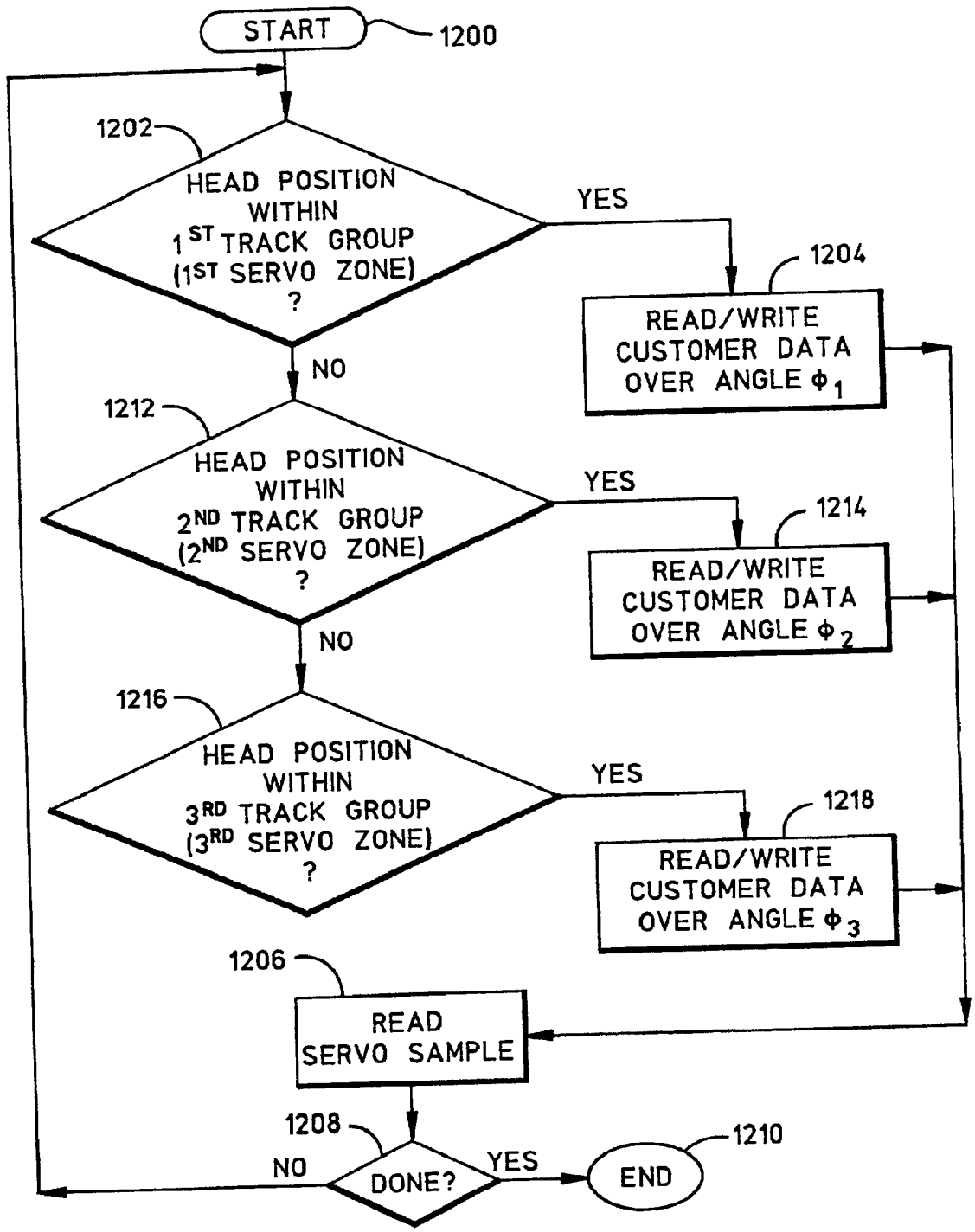
FIG. 12 is a flowchart describing a method of writing and reading information to and from a disk with use the disk drive of FIG. 5.

FIG. 12 is a flowchart which describes a method of writing and reading information to and from a disk (such as storage medium 700 of FIG. 7) using disk drive 10 of FIG. 5. FIGS. 5 and 12 are now referred to in combination. Disk drive 10 is either in a write mode or a read mode of operation; however, for proper track following disk drive 10 will always read servo samples from storage medium 700 regardless of whether disk drive 10 is in a write or read mode. Beginning at a start block 1200, disk controller 40 determines whether the head position is within a first servo zone defined by a first group of tracks (e.g., tracks 0–100) (step 1202). If so, disk controller 40 causes the reading or writing of customer data in a data track over an angle of revolution $\theta_1$ (or an actual arcuate distance of $2\pi r\theta_1/360$) around storage medium 700 (step 1204). The track information is obtained by reading the track identification (TID) from the disk. The head position information is determined by reading the servo burst information (e.g., such as servo bursts 916, 918, 920, and 922 in FIG. 9).

If the head position is not within the first servo zone at step 1202, then controller 804 determines whether the head position is within a second servo zone defined by a second group of tracks (e.g., tracks 101–200) (step 1212). If so, disk controller 40 controls causes the reading or writing of customer data in a data track over an angle of revolution $\theta_2=\theta_1{}^*N_1$, (or an actual arcuate distance of $2\pi r\theta_2/360$) around storage medium 700 (step 1114). If the head position is not within the second servo zone at step 1212, then disk controller 40 determines whether the head position is within a third servo zone defined by a third group of tracks (e.g., tracks 201–300) around storage medium 700 (step 1216). If so, disk controller 40 causes the reading or writing of customer data in a data track over an angle of revolution $\theta_3=\theta_2{}^*N_2$ (or an actual arcuate distance of $2\pi r\theta_3/360$) (step 1218). Once the customer data is read from or written to the track (i.e., once the appropriate angle has been traversed by either step 1204, 1214, or 1218), a servo sample is read from storage medium 700 at the new head position (step 1206). Disk drive 10 uses the servo sample information to perform a track following operation. When the reading or writing customer data is complete (step 1208), the flowchart ends at an end block 1210; otherwise, the flowchart starts again at step 1202.

Thus, disk drive 10 performs track following based on detecting $S_1$ servo samples per disk revolution in the first servo zone, performs track following based on detecting $S_1/N_1$ servo samples per disk revolution in the second servo zone, and performs track following based on detecting $S_2/N_2$ servo samples per disk revolution in the third servo zone (where $S_2=S_1/N_1$ and $S_3=S_2/N_2$, and $S_1$, $S_2$, $S_3$, $N_1$, and $N_2$ are integers $\geq 2$).

The relationship between servo samples in different servo zones as described herein allows for simple servo detection from servo zone to servo zone during read and write modes of operation. The servo detector of disk drive 10 is configured to operate at the maximum servo sampling frequency to accommodate the servo zone at the outermost position of the disk (i.e., first servo zone) as in conventional operation. For the adjacent servo zone (i.e., second servo zone), the servo detector operates in the same manner except that it reads and causes the processing of only every $N_1$th position at which a servo sample appears in the first servo zone. Where $N_1=2$, for example, every other servo position is merely "skipped" or ignored in the second servo zone. For the next adjacent servo zone (i.e., third servo zone), the servo detector reads and causes the processing of only every $N_2$th position at which a servo sample appears in the second servo zone (or, put another way, only every $(N_1{}^*N_2)$th position at which a servo sample appears in the first servo zone). Where $N_1=N_2=2$, for example, every 4th servo position is merely "skipped" or ignored in the third servo zone.

Figure 13:
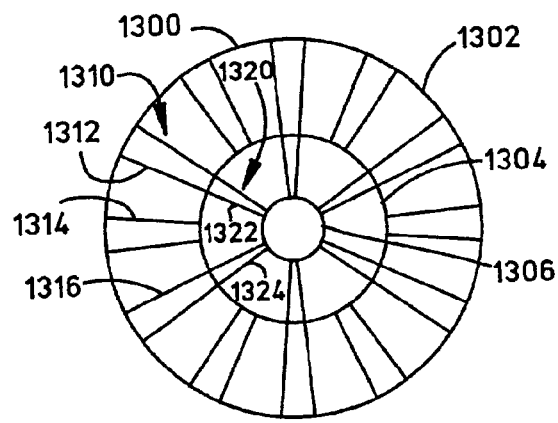
FIGS. 13–16 are additional examples of a disk for use in the disk drive of FIG. 5.

An example of a recordable disk 1300 of an alternate embodiment is shown in FIG. 13. Disk 1300 has an outermost circumferential position 1302, an intermediate circumferential position 1304, and an innermost circumferential position 1306, where intermediate position 1304 lies in between outermost and innermost positions 1302 and 1306. A first servo zone lies within outermost position 1302 and intermediate position 1304, and a second servo zone lies within intermediate position 1304 and innermost position 1306. The first servo zone has a first plurality of $S_1$ servo sample wedges 1310 (such as wedges 1312, 1314, and 1316), and the second servo zone has a second plurality of $S_2$ servo sample wedges 1320 (such as wedges 1322 and 1324). In the specific example shown in FIG. 13, $S_1$ is twelve (12) and $S_2$ is six (6). $S_2$ servo sample wedges of the second plurality 1320 are in radial alignment with every $N_1$th wedge of the $S_1$ servo sample wedges of the first plurality 1310. In this specific example, $N_1=2$, and therefore $S_2$ servo sample wedges of the second plurality 1320 are in radial alignment with every other wedge (i.e., every 2nd wedge) of the $S_1$ servo sample wedges of the first plurality 1310. More particularly, for example, $S_1$ wedge 1312 is in radial alignment with $S_2$ wedge 1322 and $S_1$ wedge 1316 is in radial alignment with $S_2$ wedge 1324, whereas $S_1$ wedge 1314 is not in radial alignment with any $S_2$ wedge. Also, $S_1$ servo sample wedges of the first plurality 1310 are equally spaced apart circumferentially around disk 1300 by a first angle $\theta_1$, whereas $S_2$ servo sample wedges of the second plurality 1320 are equally spaced apart circumferentially around the disk by a second angle $\theta_2=\theta_1*N_1$. In this specific example, $\theta_1=30$ degrees and therefore $\theta_2=\theta_1*N_1=30*2=60$ degrees.

Figure 14:
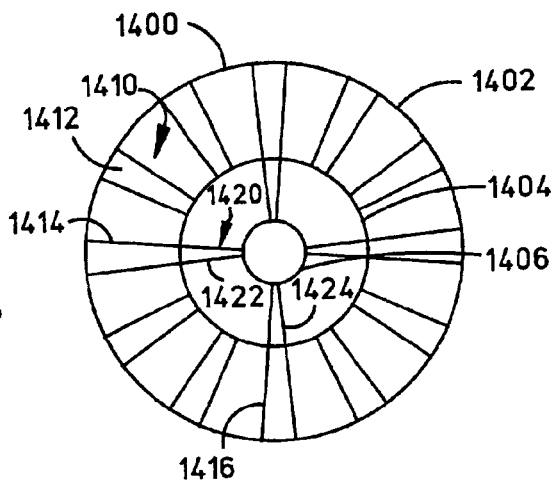

Another example of a recordable disk 1400 is shown in FIG. 14. Disk 1400 has an outermost circumferential position 1402, an intermediate circumferential position 1404, and an innermost circumferential position 1406, where intermediate position 1404 lies in between outermost and innermost positions 1402 and 1406. A first servo zone lies within outermost position 1402 and intermediate position 1404, and a second servo zone lies within intermediate position 1404 and innermost position 1406. The first servo zone has a first plurality of $S_1$ servo sample wedges 1410 (such as wedges 1412, 1414, and 1416), and the second servo zone has a second plurality of $S_2$ servo sample wedges 1420 (such as wedges 1422 and 1424). In the specific example shown in FIG. 14, $S_1$ is twelve (12) and $S_2$ is four (4). $S_2$ servo sample wedges of the second plurality 1420 are in radial alignment with every $N_1$th wedge of the $S_1$ servo sample wedges of the first plurality 1410. In this specific example, $N_1=3$, and therefore $S_2$ servo sample wedges of the second plurality 1420 are in radial alignment with every 3rd wedge of the $S_1$ servo sample wedges of the first plurality 1410. More particularly, for example, $S_1$ wedge 1414 is in radial alignment with $S_2$ wedge 1422 and $S_1$ wedge 1416 is in radial alignment with $S_2$ wedge 1424, whereas $S_1$ wedge 1412 is not in radial alignment with any $S_2$ wedge. Also, $S_1$ servo sample wedges of the first plurality 1410 are equally spaced apart circumferentially around disk 1400 by a first angle $\theta_1$, whereas $S_2$ servo sample wedges of the second plurality 1420 are equally spaced apart circumferentially around the disk by a second angle $\theta_2=\theta_1*N_1$. In this specific example, $\theta_1=30$ degrees and therefore $\theta_2=\theta_1*N_1=30*3=90$ degrees.

Figure 15:
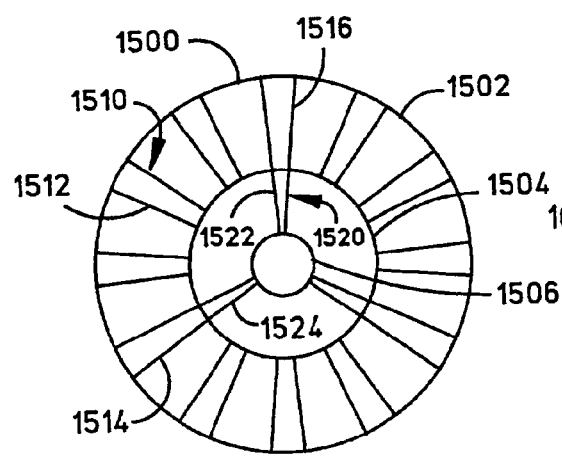

Even another example of a recordable disk 1500 is shown in FIG. 15. Disk 1500 has an outermost circumferential position 1502, an intermediate circumferential position 1504, and an innermost circumferential position 1506, where intermediate position 1504 lies in between outermost and innermost positions 1502 and 1506. A first servo zone lies within outermost position 1502 and intermediate position 1504, and a second servo zone lies within intermediate position 1504 and innermost position 1506. The first servo zone has a first plurality of $S_1$ servo sample wedges 1510 (such as wedges 1512, 1514, and 1516), and the second servo zone has a second plurality of $S_2$ servo sample wedges 1520 (such as wedges 1522 and 1524). In the specific example shown in FIG. 15, $S_1$ is twelve (12) and $S_2$ is three (3). $S_2$ servo sample wedges of the second plurality 1520 are in radial alignment with every $N_1$th wedge of the $S_1$ servo sample wedges of the first plurality 1510. In this specific example, $N_1=4$, and therefore $S_2$ servo sample wedges of the second plurality 1520 are in radial alignment with every 4th wedge of the $S_1$ servo sample wedges of the first plurality 1510. More particularly, for example, $S_1$ wedge 1514 is in radial alignment with $S_2$ wedge 1524 and $S_1$ wedge 1516 is in radial alignment with $S_2$ wedge 1522, whereas $S_1$ wedge 1512 is not in radial alignment with any $S_2$ wedge. Also, $S_1$ servo sample wedges of the first plurality 1510 are equally spaced apart circumferentially around disk 1500 by a first angle $\theta_1$, whereas $S_2$ servo sample wedges of the second plurality 1520 are equally spaced apart circumferentially around the disk by a second angle $\theta_2=\theta_1*N_1$. In this specific example, $\theta_1=30$ degrees and therefore $\theta_2=\theta_1*N_1=30*4=120$ degrees.

Figure 16:
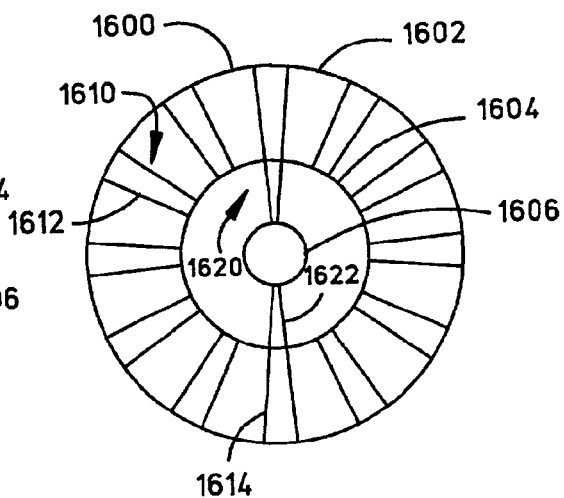

A final example of a recordable disk 1600 is shown in FIG. 16. Disk 1600 has an outermost circumferential position 1602, an intermediate circumferential position 1604, and an innermost circumferential position 1606, where intermediate position 1604 lies in between outermost and innermost positions 1602 and 1606. A first servo zone lies within outermost position 1602 and intermediate position 1604, and a second servo zone lies within intermediate position 1604 and innermost position 1606. The first servo zone has a first plurality of $S_1$ servo sample wedges 1610 (such as wedges 1612 and 1614), and the second servo zone has a second plurality of $S_2$ servo sample wedges 1620 (such as wedge 1622). In the specific example shown in FIG. 16, $S_1$ is twelve (12) and $S_2$ is two (2). $S_2$ servo sample wedges of the second plurality 1620 are in radial alignment with every $N_1$th wedge of the $S_1$ servo sample wedges of the first plurality 1610. In this specific example, $N_1=6$, and therefore $S_2$ servo sample wedges of the second plurality 1620 are in radial alignment with every 6th wedge of the $S_1$ servo sample wedges of the first plurality 1610. More particularly, for example, $S_1$ wedge 1614 is in radial alignment with $S_2$ wedge 1622, whereas $S_1$ wedge 1612 is not in radial alignment with any $S_2$ wedge. Also, $S_1$ servo sample wedges of the first plurality 1610 are equally spaced apart circumferentially around disk 1600 by a first angle $\theta_1$, whereas $S_2$ servo sample wedges of the second plurality 1620 are equally spaced apart circumferentially around the disk by a second angle $\theta_2=\theta_1*N_1$. In this specific example, $\theta_1=30$ degrees and therefore $\theta_2=\theta_1*N_1 30*6=180$ degrees.

As described herein, the present invention involves a recordable disk having a first plurality of $S_1$ servo sample wedges in a first servo zone at an outermost position on the disk, and a second plurality of $S_2$ servo sample wedges in a second servo zone which is radially adjacent the first servo zone, where $S_2=S_1/N_1$. The $S_1$ servo sample wedges of the first plurality are equally spaced apart circumferentially around the disk by a first angle $\theta_1$, and the $S_2$ servo sample wedges of the second plurality being equally spaced apart circumferentially around the disk by a second angle $\theta_2=\theta_1*N_1$. The $S_2$ servo sample wedges of the second plurality are in radial alignment with every $N_1$th wedge of the $S_1$ servo sample wedges of the first plurality. Preferably, $N_1=2$.

The recordable disk may have additional servo zones patterned in the same manner. For example, the recordable disk may have a third plurality of $S_3$ servo sample wedges in a third servo zone which is radially adjacent the second servo zone, where $S_3=S_2/N_2$. The $S_3$ servo sample wedges of the third plurality are equally spaced apart circumferentially around the disk by a third angle $\theta_3=\theta_2*N_2$. The $S_3$ servo sample wedges of the third plurality are in radial alignment with every $N_2$th wedge of the $S_2$ servo sample wedges of the second plurality. Advantageously, the number of servo samples are increased at the outer position of the disk for improved head positioning without increasing the number of servo samples at the inner position which would undesirably decrease storage capacity, in such a way that does not require significant changes to servo hardware and software.

Put another way, a recordable disk has a first plurality of $S_1$ servo sample wedges and a second plurality of servo sample wedges. The first plurality of $S_1$ servo sample wedges are equally spaced apart circumferentially around the disk, where each wedge of the first plurality of $S_1$ servo sample wedges contiguously radially extends from an outermost position on the disk to an innermost position on the disk. The second plurality of $S_2$ servo sample wedges are equally spaced apart circumferentially around the disk and interleaved with the first plurality of $S_1$ servo sample wedges, where each wedge of the second plurality of $S_2$ servo sample wedges contiguously radially extends from the outermost position on the disk to a first intermediate position on the disk in between the outermost and innermost positions. Preferably, $S_1=S_2$. The recordable disk may be patterned in a similar manner with additional servo sample wedges. For example, the recordable disk may have a third plurality of $S_1$ servo sample wedges which are equally spaced apart circumferentially around the disk and interleaved with the second plurality of $S_2$ servo sample wedges, where each wedge of the third plurality of $S_2$ servo sample wedges contiguously radially extends from the outermost position on the disk to a second intermediate position on the disk in between the outermost position and the first intermediate position. Preferably, $S_3=S_1+S_2$.

A method of writing servo samples on a recordable disk involves the acts of writing a first plurality of $S_1$ servo sample wedges in a first servo zone at an outermost position on the recording disk; and writing a second plurality of $S_2$ servo sample wedges in a second servo zone which is radially adjacent the first servo zone, such that the $S_2$ servo sample wedges of the second plurality are in radial alignment with every $N_1$th wedge of the $S_1$ servo sample wedges of the first plurality, where $S_1$, $S_2$, and $N_1$ are integers $\geq 2$ and $S_2=S_1/N_1$. Preferably, $N_1=2$. The act of writing the first plurality of $S_1$ servo sample wedges may further involve writing such that the $S_1$ servo sample wedges of the first plurality are equally spaced apart circumferentially by a first angle $\theta_1$; and the act of writing the second plurality of $S_2$ servo sample wedges may further involve writing such that the $S_2$ servo sample wedges of the second plurality are equally spaced apart circumferentially by a second angle $\theta_2$, where $\theta_2=\theta_1*N_1$.

The method may include the further acts of writing a third plurality of $S_3$ servo sample wedges in a third servo zone which is radially adjacent the second servo zone, such that the $S_3$ servo sample wedges of the third plurality are in radial alignment with every $N_2$th wedge of the $S_2$ servo sample wedges of the second plurality, where $S_3$ is an integer and $S_3=S_2/N_2$. Preferably, $N_2=2$. Here, the act of writing the third plurality of $S_3$ servo sample wedges may further involve writing such that the $S_3$ servo sample wedges of the third plurality are equally spaced apart circumferentially by a third angle $\theta_3$, where $\theta_3=\theta_2*N_2$.

Finally, a method of track following a recordable disk having a first plurality of $S_1$ servo sample wedges in a first servo zone and a second plurality of $S_2$ servo sample wedges in a second servo zone, wherein the $S_1$ servo sample wedges of the first plurality are equally spaced apart circumferentially around the disk by a first angle $\theta_1$ and the $S_2$ servo sample wedges of the second plurality are equally spaced apart circumferentially around the disk by a second angle $\theta_2$, includes the acts of performing a track following operation based on detecting $S_1$ servo samples per disk revolution in the first servo zone; and performing a track following operation based on detecting $S_1/N_1$ servo samples per disk revolution in the second servo zone, where $S_2=S_1/N_1$ and $S_1$, $S_2$, and $N_1$ are integers $\geq 2$.

It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A recordable disk, comprising:
   a first plurality of $S_1$ servo sample wedges in a first servo zone at an outermost position on the disk;
   a second plurality of $S_2$ servo sample wedges in a second servo zone which is radially adjacent the first servo zone, where $S_2=S_1/N_1$ and $S_1$, $S_2$, and $N_1$ are integers $\geq 2$; and
   the $S_2$ servo sample wedges of the second plurality being in radial alignment with every $N_1$th wedge of the $S_1$ servo sample wedges of the first plurality.

2. The recordable disk of claim 1, further comprising:
   the $S_1$ servo sample wedges of the first plurality being equally spaced apart circumferentially around the disk by a first angle $\theta_1$; and
   the $S_2$ servo sample wedges of the second plurality being equally spaced apart circumferentially around the disk by a second angle $\theta_2=\theta_1*N_1$.

3. The recordable disk of claim 2, wherein $N_1=2$.

4. The recordable disk of claim 2, further comprising:
   a third plurality of $S_3$ servo sample wedges in a third servo zone which is radially adjacent the second servo zone, where $S_3=S_2/N_2$ and $S_3$ and $N_2$ are integers $\geq 2$; and
   the $S_3$ servo sample wedges of the third plurality being in radial alignment with a every $N_2$th wedge of the $S_2$ servo sample wedges of the second plurality.

5. The recordable disk of claim 4, further comprising:
   the $S_3$ servo sample wedges of the third plurality being equally spaced apart circumferentially around the disk by a third angle $\theta_3=\theta_2*N_2$.

6. The recordable disk of claim 5, wherein $N_2=2$.

7. The recordable disk of claim 1, further comprising:
   a third plurality of $S_3$ servo sample wedges in a third servo zone which is radially adjacent the second servo zone, where $S_3=S_2/N_2$, and $S_3$ and $N_2$ are integers $\geq 2$;
   the $S_3$ servo sample wedges of the third plurality being in radial alignment with every $N_2$th wedge of the $S_2$ servo sample wedges of the second plurality;
   the $S_1$ servo sample wedges of the first plurality being equally spaced apart circumferentially around the disk by a first angle $\theta_1$;
   the $S_2$ servo sample wedges of the second plurality being equally spaced apart circumferentially around the disk by a second angle $\theta_2=\theta_1*N_1$; and
   the $S_3$ servo sample wedges of the third plurality being equally spaced apart circumferentially around the disk by a third angle $\theta_3=\theta_2*N_2$.

8. A recordable disk, comprising:
   a first plurality of $S_1$ servo sample wedges in a first servo zone at an outermost position on the disk;
   the $S_1$ servo sample wedges of the first plurality being equally spaced apart circumferentially around the disk by a first angle $\theta_1$;
   a second plurality of $S_2$ servo sample wedges in a second servo zone which is radially adjacent the first servo zone, where $S_2=S_1/N_1$ and $S_1$, $S_2$ and $N_1$ are integers $\geq 2$;

the $S_2$ servo sample wedges of the second plurality being equally spaced apart circumferentially around the disk by a second angle $\theta_2=\theta_1*N_1$; and the $S_2$ servo sample wedges of the second plurality being in radial alignment with every $N_1$th wedge of the $S_1$ servo sample wedges of the first plurality.

9. A recording device, comprising:

at least one recordable disk;

a spindle supporting the at least one recordable disk;

a motor for rotating the at least one recordable disk;

a recording head for recording data to the at least one recordable disk;

the at least one recordable disk further including:
- a first plurality of $S_1$ servo sample wedges in a first servo zone at an outermost position on the recordable disk;
- a second plurality of $S_2$ servo sample wedges in a second servo zone which is radially adjacent the first servo zone, where $S_2=S_1/N_1$ and $S_1$, $S_2$, and $N_1$ are integers $\geq 2$; and
- the $S_2$ servo sample wedges of the second plurality being in radial alignment with every $N_1$th wedge of the $S_1$ servo sample wedges of the first plurality.

10. The recording device of claim 9, further comprising:

the $S_1$ servo sample wedges of the first plurality being equally spaced apart circumferentially around the disk by a first angle $\theta_1$; and the $S_2$ servo sample wedges of the second plurality being equally spaced apart circumferentially around the disk by a second angle $\theta_2=\theta_1*N_1$.

11. The recording device of claim 10, wherein $N_1=2$.

12. The recording device of claim 10, further comprising:

a third plurality of $S_3$ servo sample wedges in a third servo zone which is radially adjacent the second servo zone, where $S_3=S_2/N_2$ and $S_3$ and $N_2$ are integers $\geq 2$; and the $S_3$ servo sample wedges of the third plurality being in radial alignment with every $N_2$th one of the $S_2$ servo sample wedges of the second plurality.

13. The recording device of claim 12, further comprising:

the $S_3$ servo sample wedges of the third plurality being equally spaced apart circumferentially around the disk by a third angle $\theta_3=\theta_2*N_2$.

14. The recording device of claim 13, wherein $N_2=2$.

15. The recording device of claim 9, further comprising:

a third plurality of $S_3$ servo sample wedges in a third servo zone which is radially adjacent the second servo zone, where $S_3=S_2/N_2$ and $S_3$ and $N_2$ are integers $\geq 2$;

the $S_3$ servo sample wedges of the third plurality being in radial alignment with every other one of the $S_2$ servo sample wedges of the second plurality;

the $S_1$ servo sample wedges of the first plurality being equally spaced apart circumferentially around the disk by a first angle $\theta_1$;

the $S_2$ servo sample wedges of the second plurality being equally spaced apart circumferentially around the disk by a second angle $\theta_2=\theta_1*N_1$; and the $S_3$ servo sample wedges of the third plurality being equally spaced apart circumferentially around the disk by a third angle $\theta_3=\theta_2*N_2$.

16. A method of writing servo samples on a recordable disk, the method comprising the acts of:

writing a first plurality of $S_1$ servo sample wedges in a first servo zone at an outermost position on the recording disk; and writing a second plurality of $S_2$ servo sample wedges in a second servo zone which is radially adjacent the first servo zone, such that the $S_2$ servo sample wedges of the second plurality are in radial alignment with every $N_1$th wedge of the $S_1$ servo sample wedges of the first plurality, where $S_2=S_1/N_1$ and $S_1$, $S_2$, and $N_1$ are integers $\geq 2$.

17. The method of claim 16, further comprising:

wherein writing the first plurality of $S_1$ servo sample wedges further includes writing such that the $S_1$ servo sample wedges of the first plurality are equally spaced apart circumferentially by a first angle $\theta_1$; and wherein writing the second plurality of $S_2$ servo sample wedges further includes writing such that the $S_2$ servo sample wedges of the second plurality are equally spaced apart circumferentially by a second angle $\theta_2=\theta_1*N_1$.

18. The method of claim 17, wherein $N_1=2$.

19. The method of claim 16, further comprising:

writing a third plurality of $S_3$ servo sample wedges in a third servo zone which is radially adjacent the second servo zone, such that the $S_3$ servo sample wedges of the third plurality are in radial alignment with every $N_2$th wedge of the $S_2$ servo sample wedges of the second plurality, where $S_3$ is an integer and $S_3=S_2/N_2$.

20. The method of claim 16, further comprising:

wherein writing the third plurality of $S_3$ servo sample wedges further includes writing such that the $S_3$ servo sample wedges of the third plurality are equally spaced apart circumferentially by a third angle $\theta_3=\theta_2*N_2$.

21. The method of claim 16, wherein $N_2=2$.

22. The method of claim 16, further comprising:

writing a third plurality of $S_3$ servo sample wedges in a third servo zone which is radially adjacent the second servo zone, where $S_3=S_2/N_2$ and $S_3$ and $N_2$ are integers $\geq 2$;

wherein writing the third plurality of $S_3$ servo sample wedges further includes writing such that the $S_3$ servo sample wedges of the third plurality are in radial alignment with every $N_2$th wedge of the $S_2$ servo sample wedges of the second plurality;

wherein writing the first plurality of $S_1$ servo sample wedges further includes writing such that the $S_1$ servo sample wedges of the first plurality are equally spaced apart circumferentially by a first angle $\theta_1$;

wherein writing the second plurality of $S_2$ servo sample wedges further includes writing such that the $S_2$ servo sample wedges of the second plurality are equally spaced apart circumferentially by a second angle $\theta_2=\theta_1*N_1$; and wherein writing the third plurality of $S_3$ servo sample wedges further includes writing such that the $S_3$ servo sample wedges of the third plurality are equally spaced apart circumferentially by a third angle $\theta_3=\theta_2*N_2$.

23. A recordable disk, comprising:

a first plurality of $S_1$ servo sample wedges which are equally spaced apart circumferentially around the disk;

each wedge of the first plurality of $S_1$ servo sample wedges contiguously radially extending from an outermost position on the disk to an innermost position on the disk;

a second plurality of $S_2$ servo sample wedges which are interleaved with the first plurality of $S_1$ servo sample wedges such that the S1 and S2 servo sample wedges are equally spaced apart circumferentially along the outermost position on the disk; and each wedge of the second plurality of $S_2$ servo sample wedges contiguously radially extending from the outermost position on the disk to a first intermediate position on the disk in between the outermost and innermost positions.

24. The recordable disk of claim 23, wherein $S_1=S_2$.

25. The recordable disk of claim 23, further comprising:

a third plurality of $S_3$ servo sample wedges which are equally spaced apart circumferentially around the disk and interleaved with the second plurality of $S_2$ servo sample wedges; and each wedge of the third plurality of $S_2$ servo sample wedges contiguously radially extending from the outermost position on the disk to a second intermediate position on the disk in between the outermost position and the first intermediate position.

26. The recordable disk of claim 25, wherein $S_3=S_1+S_2$.

27. A method of track following on a recordable disk having a first plurality of $S_1$ servo sample wedges in a first servo zone and a second plurality of $S_2$ servo sample wedges in a second servo zone, wherein the $S_1$ servo sample wedges of the first plurality are equally spaced apart circumferentially around the disk by a first angle $\theta_1$ and the $S_2$ servo sample wedges of the second plurality are equally spaced apart circumferentially around the disk by a second angle $\theta_2$, the method comprising the acts of:

performing a track following operation based on detecting $S_1$ servo samples per disk revolution in the first servo zone; and performing a track following operation based on detecting $S_2=S_1/N_1$ servo samples per disk revolution in the second servo zone, where $S_1$, $S_2$, and $N_1$ are integers $\geq 2$.

28. The method of claim 27, wherein the $S_2$ servo samples are in radial alignment with every $N_1$th sample of the $S_1$ servo samples.

29. The method of claim 28, wherein $N_1=2$.

30. The method of claim 27, further comprising:

performing a track following operation based on detecting $S_3=S_2/N_2$ servo samples per disk revolution in a third servo zone, where $S_3$ and $N_2$ are integers $\geq 2$.

31. The method of claim 30, wherein the $S_3$ servo samples are in radial alignment with every $N_2$th sample of the $S_2$ servo samples.

32. The method of claim 30, wherein $N_2=2$.

* * * * *

UNITED STATES PATENT AND TRADEMARK OFFICE
CERTIFICATE OF CORRECTION

PATENT NO.    : 6,865,042 B2
DATED         : March 8, 2005
INVENTOR(S)   : Dunn et al.

It is certified that error appears in the above-identified patent and that said Letters Patent is hereby corrected as shown below:

Title page,
Item [73], Assignee, replace "Hitachi Global Storage Technologies N.V., Amsterdam (NL)" with -- Hitachi Global Storage Technologies B.V., Amsterdam (NL) --.

Column 3,
Lines 3 and 21, for each occurrence that portion of the formula reading "≦" should read -- $\leq$ --.

Column 6,
Line 48, that portion of the formula reading "$\Theta_L=$" should read -- $\Theta_l=$ --.
Line 51, for each occurrence that portion of the formula reading "≦" should read -- $\leq$ --.

Column 9,
Line 34, each occurrence of the symbol "≧" should be replaced with the symbol -- $\geq$ --.

Column 10,
Line 29, each occurrence of the symbol "≧" should be replaced with the symbol -- $\geq$ --.

Column 13,
Line 66, each occurrence of the symbol "≧" should be replaced with the symbol -- $\geq$ --.

Column 14,
Lines 16, 31, 43 and 65, each occurrence of the symbol " ≧" should be replaced with the symbol -- $\geq$ --.

Column 15,
Lines 20, 35 and 47, each occurrence of the symbol "≧" should be replaced with the symbol -- $\geq$ --.

UNITED STATES PATENT AND TRADEMARK OFFICE
CERTIFICATE OF CORRECTION

PATENT NO. : 6,865,042 B2
DATED : March 8, 2005
INVENTOR(S) : Dunn et al.

It is certified that error appears in the above-identified patent and that said Letters Patent is hereby corrected as shown below:

Column 16,
Lines 7 and 36, each occurrence of the symbol "≧" should be replaced with the symbol -- ≥ --.

Column 18,
Lines 9 and 17, each occurrence of the symbol "≧" should be replaced with the symbol -- ≥ --.

Signed and Sealed this

Eleventh Day of October, 2005

JON W. DUDAS
*Director of the United States Patent and Trademark Office*